(12) United States Patent
Kamata et al.

(10) Patent No.: US 7,747,043 B2
(45) Date of Patent: Jun. 29, 2010

(54) REGISTRATION METHOD FOR BIOMETRICS AUTHENTICATION SYSTEM, BIOMETRICS AUTHENTICATION SYSTEM, AND PROGRAM FOR SAME

(75) Inventors: Hideo Kamata, Inagi (JP); Takumi Kishino, Inagi (JP); Shinichi Eguchi, Inagi (JP); Masaki Watanabe, Kawasaki (JP); Toshio Endoh, Kawasaki (JP); Mitsuaki Fukuda, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1167 days.

(21) Appl. No.: 11/086,992

(22) Filed: Mar. 23, 2005

(65) Prior Publication Data

US 2005/0286745 A1 Dec. 29, 2005

(30) Foreign Application Priority Data

Jun. 28, 2004 (JP) ............................. 2004-190437

(51) Int. Cl.
*G06K 9/00* (2006.01)
(52) U.S. Cl. ................. 382/115; 382/117; 382/118; 382/119; 382/124
(58) Field of Classification Search ................. 382/115
See application file for complete search history.

(56) References Cited

U.S. PATENT DOCUMENTS

| | | | |
|---|---|---|---|
| 5,999,637 A * | 12/1999 | Toyoda et al. ............... | 382/124 |
| 7,050,609 B2 * | 5/2006 | Huang ........................ | 382/124 |
| 7,184,579 B2 * | 2/2007 | Mizoguchi .................. | 382/124 |
| 2005/0129286 A1 * | 6/2005 | Hekimian ................... | 382/117 |
| 2005/0148876 A1 | 7/2005 | Endoh et al. | |
| 2006/0078177 A1 * | 4/2006 | Niinuma et al. ............. | 382/124 |

FOREIGN PATENT DOCUMENTS

| | | |
|---|---|---|
| JP | 01-263775 | 10/1989 |
| JP | 03-142685 | 6/1991 |
| JP | 06-139336 | 5/1994 |

(Continued)

OTHER PUBLICATIONS

Uludag, U, Ross, A., Jain, A., "Biometric template selection and update: a case study in fingerprints", Pattern Recognition, vol. 37, Issue 7, Jul. 2004 (Available online Feb. 18, 2004), pp. 1533-1542.*
Jain A. et al., "Biometric Template Selection: A Case Study in Fingerprints", Proc. 4th International Conference on Audio and video-based person authentication, Jun. 9-11, 2003, pp. 335-342, XP007902580, Guildford, UK.

(Continued)

*Primary Examiner*—Sath V Perungavoor
(74) *Attorney, Agent, or Firm*—Westerman, Hattori, Daniels & Adrian, LLP

(57) ABSTRACT

A biometrics authentication system uses biometrics information to authenticate individuals. A processing unit acquires biometrics information for the same living body a plurality of times from a detection unit, judges the mutual degree of similarity between biometrics characteristic data sets extracted from the above biometrics information acquired a plurality of times, and registers a plurality of biometrics characteristic data sets with a high degree of similarity in a storage unit. As a result, verification can be performed which accommodates changes in the state of the living body, without lowering verification accuracy.

16 Claims, 12 Drawing Sheets

FOREIGN PATENT DOCUMENTS

| | | |
|---|---|---|
| JP | 10-187986 A | 7/1998 |
| JP | 11-232459 | 8/1999 |
| JP | 2001-273497 A | 10/2001 |
| JP | 2002-063576 A | 2/2002 |
| JP | 2003-256817 A | 9/2003 |
| JP | 2004-086463 A | 3/2004 |
| KR | 1994-0009714 | 10/1994 |
| KR | 1020030006789 A | 1/2003 |
| WO | WO 2004/021884 A1 | 3/2004 |

OTHER PUBLICATIONS

European Search Report dated Jul. 17, 2007, issued in corresponding European Patent Application No. 05 25 2051.

SG Publication No. 76590; SG Application No. 9900624-9 Filing date Feb. 18, 1999; NEC Corporation (JP).

Office Action issued on Feb. 16, 2010 in corresponding Japanese patent application No. 2004-190437.

* cited by examiner

FIG. 7

BIOMETRICS CHARACTER DATA N1

| 0 | 0 | 0 | 0 | 0 | 0 | 0 | 0 |
|---|---|---|---|---|---|---|---|
| 0 | 255 | 255 | 255 | 255 | 255 | 255 | 255 |
| 0 | 255 | 0 | 0 | 0 | 0 | 0 | 255 |
| 0 | 255 | 0 | 255 | 255 | 255 | 0 | 255 |
| 0 | 255 | 0 | 255 | 0 | 255 | 0 | 255 |
| 0 | 255 | 0 | 255 | 0 | 0 | 0 | 255 |
| 0 | 255 | 0 | 255 | 255 | 255 | 255 | 255 |
| 0 | 0 | 0 | 0 | 0 | 0 | 0 | 0 |

BIOMETRICS CHARACTER DATA N2

| 0 | 0 | 0 | 0 | 0 | 0 | 0 | 0 |
|---|---|---|---|---|---|---|---|
| 255 | 255 | 255 | 255 | 255 | 255 | 255 | 255 |
| 255 | 0 | 0 | 0 | 0 | 0 | 0 | 255 |
| 255 | 0 | 0 | 255 | 255 | 0 | 255 | 255 |
| 255 | 0 | 0 | 255 | 0 | 0 | 255 | 255 |
| 255 | 0 | 0 | 255 | 0 | 0 | 0 | 255 |
| 255 | 0 | 0 | 255 | 255 | 255 | 255 | 255 |
| 255 | 0 | 0 | 0 | 0 | 0 | 0 | 0 |

FIG. 8

| PERSONAL ID | BIOMETRICS CHARACTER DATA |
|---|---|
| 0001 | 0, 0, 0, 1, 1, 1, 0, 0, 0,. . . |
| 0001 | 0, 0, 0, 1, 1, 1, 1, 0, 0,. . . |
| 0001 | 0, 0, 1, 1, 1, 1, 0, 0, 0,. . . |
| 0002 | 0, 1, 1, 1, 1, 0, 0, 0, 0,. . . |
| 0002 | 0, 1, 1, 1, 1, 1, 0, 0, 0,. . . , |
| 0002 | 1, 1, 1, 1, 1, 0, 0, 0, 0,. . . |
| ⋮ | ⋮ |
|  |  |
|  |  |

REGISTRATION METHOD FOR BIOMETRICS AUTHENTICATION SYSTEM, BIOMETRICS AUTHENTICATION SYSTEM, AND PROGRAM FOR SAME

CROSS-REFERENCE TO RELATED APPLICATIONS

This application is based upon and claims the benefit of priority from the prior Japanese Patent Application No. 2004-190437, filed on Jun. 28, 2004, the entire contents of which are incorporated herein by reference.

BACKGROUND OF THE INVENTION

1. Field of the Invention

This invention relates to a registration method for a biometrics authentication system, a biometrics authentication system, and a program for same, which uses biometrics features which are a portion of the human body to authenticate individuals, and in particular relates to a registration method for a biometrics authentication system, a biometrics authentication system, and a program for same to authenticate individuals by verification detected biometrics information against registered biometrics information.

2. Description of the Related Art

There exist numerous features of the human body enabling identification of individuals, among them fingerprints, palm prints, palm types, iris patterns, retina features, blood vessel patterns, facial features, voiceprints, manners of walking, the concha of the ear, DNA, and similar. Advances in biometrics technology in recent years have been accompanied by various proposals of devices for identification of such biometrics features which are a portion of the human body, to authenticate individuals.

Since the simultaneous multiple terror attacks of September 2001, biometric authentication (fingerprint and facial authentication) has been adopted in ports and other immigration points in the U.S., and there has been worldwide interest in biometric authentication methods as means of confirming the identity of individuals with high security. In financial institutions also, biometric authentication is being studied as new means for authenticating individuals, as countermeasures to illicit withdrawal of funds made possible by theft of bankbooks and cash cards and by forgery of seals and cards, and to preclude civil suits brought against financial institutions by the victims of such crimes.

In registration of such biometrics information, methods of registration of fingerprint data have been proposed which entail detection of fingerprint data a plurality of times, extraction of common characteristic data from the plurality of sets of fingerprint data, and registration of the common characteristic data (see for example Japanese Patent Laid-open No. 01-263775 and Japanese Patent Laid-open No. 11-232459). By means of these methods, effects on registered data of changes in fingerprint shapes due to detection noise and differences in finger pressure can be prevented.

In conventional methods for registration of biometrics information, in light of the fact that exactly the same biometrics characteristic data may not be obtained each time biometrics information is detected and registered, the biometrics characteristic data is detected a plurality of times, only the common data is extracted from the plurality of sets of characteristic data, and a single biometrics characteristic data set is registered, so as to exclude noise due to the detection device and the effect of the state at the time of detection.

However, in conventional methods in which common data is extracted and registered, differences in the noise of the biometrics detection device and in the detection state at the time of biometrics detection can be excluded; but registration of common data means that there is not complete coincidence with the individual biometrics characteristic data sets actually obtained, and there is the possibility that the amount of characteristic data is different from the characteristic detection data amount. Hence when verifying registered data against verification data at the time of authentication, accurate verification may not be possible.

Further, because measurements are made of a living entity, changes due to physical condition must be taken into account, and when common data is registered, if there is a change in physical condition compared with that at the time of registration, during authentication it may be difficult to authenticate the individual even though the individual is in fact the same person, so that various problems may arise. For example, in fingerprint authentication, verification rates will differ when the fingers are damp and when the fingers are dry.

SUMMARY OF THE INVENTION

Hence an object of this invention is to provide a registration method for a biometrics authentication system, a biometrics authentication system, and a program for same, which can effectively utilize biometrics characteristic data detected a plurality of times to perform verification, even when there are differences in detection devices, changes in physical condition of the subject, and differences in detection states.

A further object of the invention is to provide a registration method for a biometrics authentication system, a biometrics authentication system, and a program for same, to perform verification corresponding to changes in the state of the living body using biometrics characteristic data detected a plurality of times, without lowering verification accuracy.

Still another object of the invention is to provide a registration method for a biometrics authentication system, a biometrics authentication system, and a program for same, to perform smooth verification with minimal problems even when there are changes in the physical condition of the living body, without lowering verification accuracy.

In order to attain these objects, a biometrics authentication system of this invention, which detect and register biometrics characteristic data from a living body, and detect the above biometrics characteristic data from the above living body and verify with the above registered characteristic data to authenticate an individual. The system has a detection unit, which detects biometrics information from the above living body; a storage unit, which stores the above registered biometrics characteristic data; and a processing unit which extracts the above characteristic data from biometrics information detected by the above detection unit and registers the characteristic data in the above storage unit, while also extracting the above characteristic data from the biometrics information detected by the above detection unit, verifying the extracted characteristic data against the characteristic data registered in the above storage unit, and authenticates the individual. And the above processing unit obtains biometrics information for the same living body a plurality of times from the above detection unit, judges the degree of mutual similarity between characteristic data from the above plurality of sets of biometrics information, and registers a plurality of characteristic data sets with a high degree of similarity in the above storage unit.

Further, a registration method for a biometrics authentication system of this invention, which detect and register biometrics characteristic data from a living body, and detect characteristic data from the above living body and verify against the above registered characteristic data to authenticate an individual. The method has a step of obtaining biometrics information for the same living body from a biometrics detection unit a plurality of times; a step of judging the degree of mutual similarity among the sets of biometrics data of the above plurality of sets of biometrics information; and a step of registering, in a storage unit, a plurality of characteristic data sets with a high degree of similarity.

Further, a program of this invention causes a computer to execute a step of obtaining biometrics information for the same living body from a biometrics detection unit a plurality of times; a step of judging the degree of mutual similarity among characteristic data of the above plurality of biometrics information sets; and a step of registering, in a storage unit, a plurality of characteristic data having a high degree of similarity.

In this invention, it is preferable that the above processing unit use the biometrics characteristic data of the first trial as reference, to judge the degree of similarity of biometrics characteristic data in the second and subsequent trials.

In this invention, it is preferable that the above processing unit obtain the above same biometrics information from the above detection unit until a prescribed number of sets of biometrics data having a high degree of similarity is obtained.

In this invention, it is preferable that the above processing unit, after registering the above plurality of characteristic data sets with a high degree of similarity in the above storage unit, acquire biometrics information from the above detection unit, extract the above characteristic data, verify this with the plurality of characteristic data sets registered in the above storage unit, and perform trial authentication.

In this invention, it is preferable that the above detection unit comprise an image capture unit which captures images of biometrics information of a user as the above biometrics information, and that biometrics characteristic data registered in the above storage unit be characteristic data obtained from the above biometrics information.

In this invention, it is preferable that the above processing unit judge the degree of similarity to be high when the above degree of similarity is equal to or greater than a prescribed threshold value.

In this invention, it is preferable that the above processing unit register the biometrics characteristic data of the first trial, and calculate the degree of similarity with the nth biometrics characteristic data set of all of the first through the (n−1)th biometrics characteristic data sets, and when the degree of similarity is in all cases equal to or greater than the threshold value, register the above n biometrics characteristic data sets in the above storage unit.

In this invention, it is preferable that at the time of individual authentication the above processing unit read the above plurality of sets of biometrics characteristic data from the above storage unit according to identification information for the above individual, acquire biometrics information from the above detection unit, extract the above characteristic data, and perform verification with the plurality of characteristic data sets registered in the above storage unit.

In this invention, it is preferable that the above processing unit detect the fact that the above extracted characteristic data is similar to one among the above plurality of registered characteristic data sets, to authenticate the individual.

In this invention, biometrics information is obtained a plurality of times from the same living body by the detection unit, the degree of mutual similarity among characteristic data sets from the above plurality of biometrics information sets is judged, and a plurality of characteristic data sets with a high degree of similarity are registered in a storage unit, so that even if biometrics characteristic data detected a plurality of times is used, stable verification corresponding to changes in the state of the living body can be performed without lowering the accuracy of verification, and moreover problems with users can be prevented.

BRIEF DESCRIPTION OF THE DRAWINGS

FIG. 7 is an explanatory diagram of the biometrics characteristic data of FIG. 6;

FIG. 8 is an explanatory diagram of registration data in the storage portion of FIG. 3;

DESCRIPTION OF THE PREFERRED EMBODIMENTS

Below, embodiments of the invention are explained, in the order of a biometrics authentication system, biometrics information registration method, biometrics information registration method to perform trial authentication, and other embodiments.

Biometrics Authentication System

Figure 1:
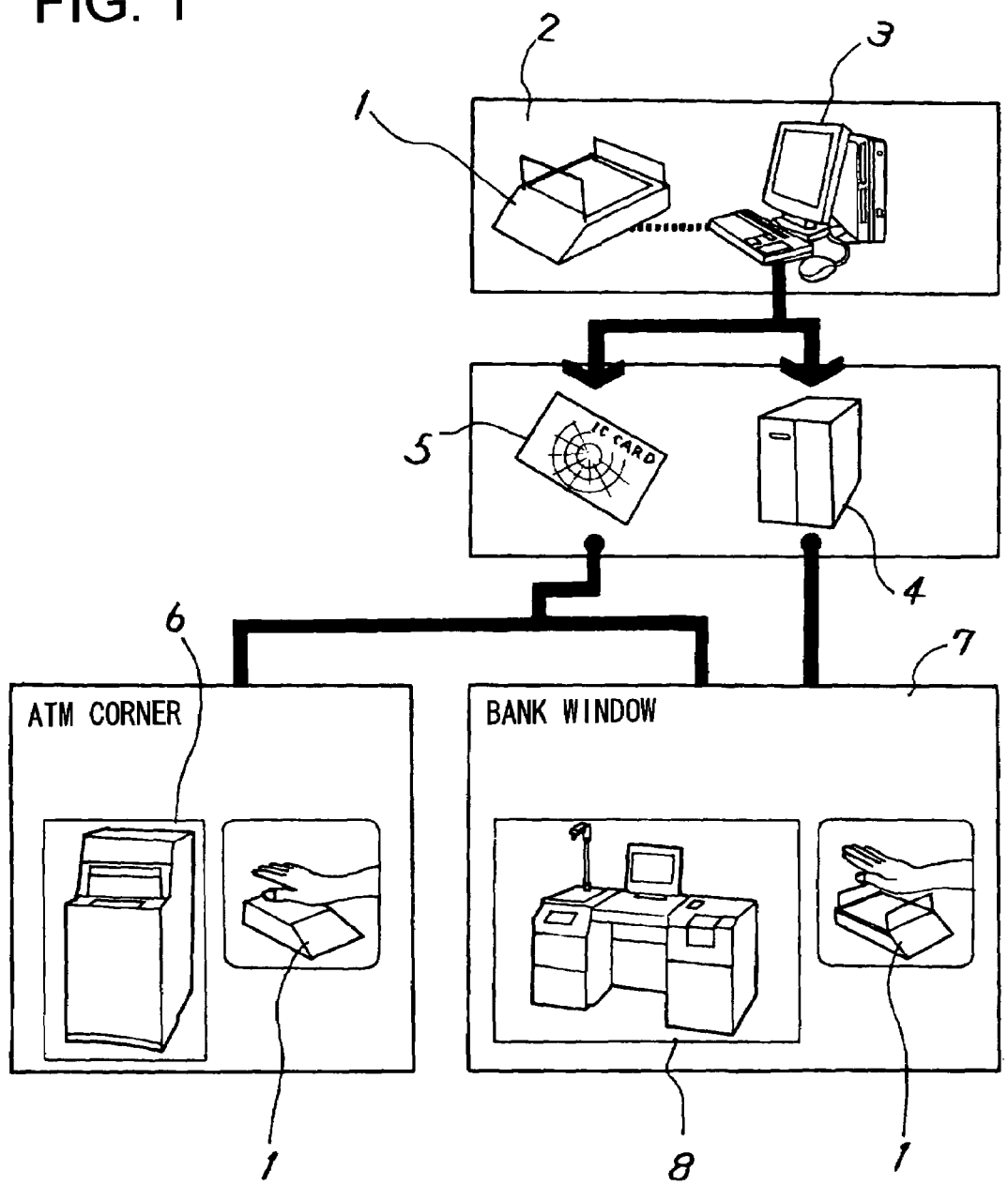
FIG. 1 shows the configuration of a biometrics authentication system in one embodiment of the invention.
Figure 2:
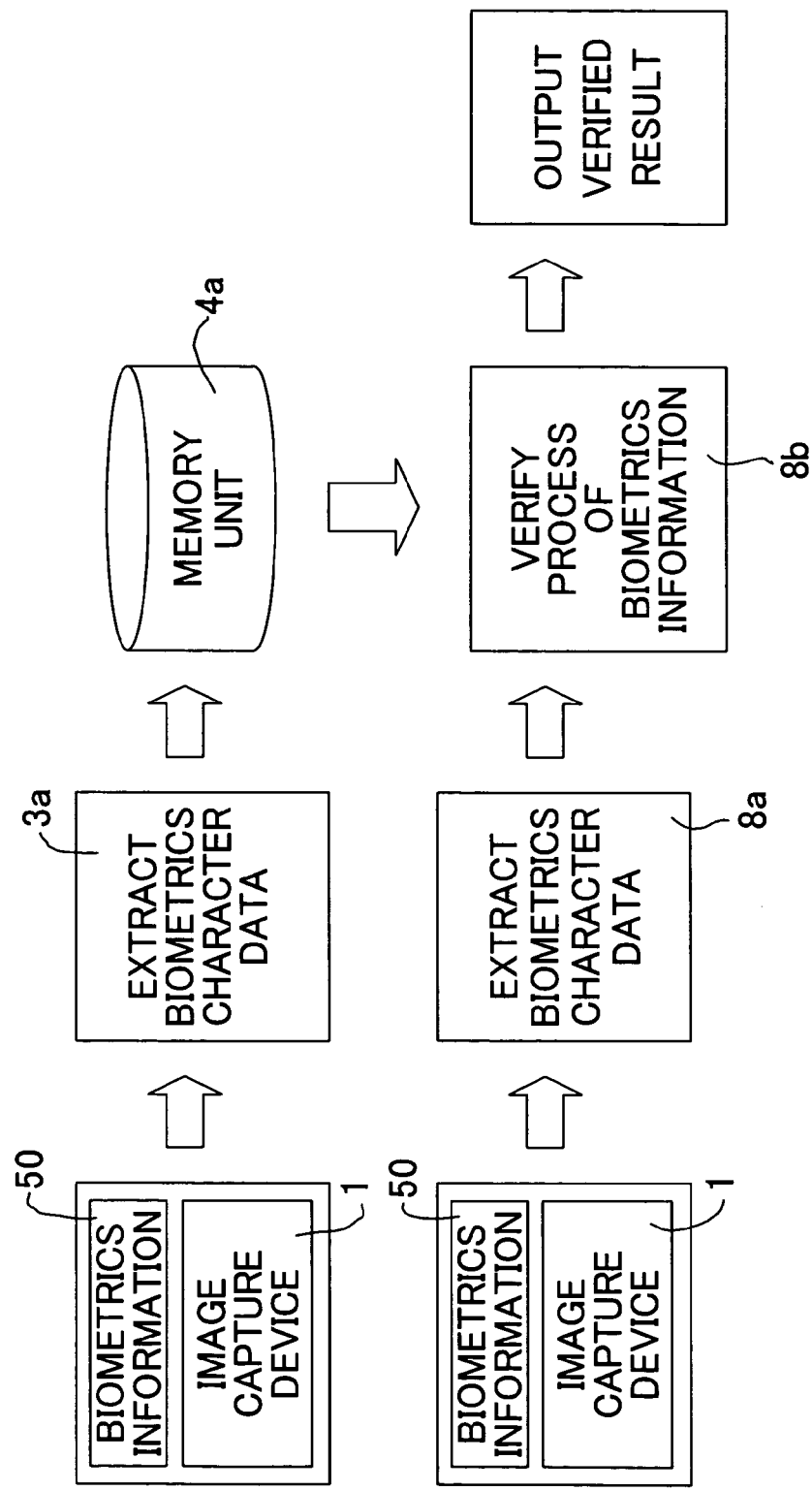
FIG. 2 is a functional block diagram of biometrics authentication processing in FIG. 1.

FIG. 1 shows the configuration of a biometrics authentication system in one embodiment of the invention; FIG. 2 is a drawing explaining the biometrics authentication processing of FIG. 1. As shown in FIG. 1, an image capture device 1 and a terminal (for example, a personal computer) 3 connected thereto are provided. As shown in FIG. 2, the image capture device 1 reads biometrics information of user, and biometrics characteristic extraction processing 3a of the terminal 3 extract and register its characteristic in the terminal 3 as biometrics characteristic information.

This biometrics characteristic data is stored in the storage portion 4a of a database server 4 connected to the terminal 3 or in an individual card 5 held by the user. The server 4 is connected to the gateway 7 of a gateway terminal 8, and the gateway terminal 8 is connected to the image capture device 1.

When the user receives service at the gateway 7, the image capture device 1 at the gateway 7 reads biometrics information of the user and biometrics characteristic extraction processing 8a by the gateway terminal 8 extract the biometrics characteristics thereof. The gateway terminal 8 verifies this against the biometrics characteristic data registered on the database server 4 as biometrics characteristic data for the user, and authenticates the individual.

Or, the server 4 is connected to an automated gateway device 6. In order to use the automated gateway device 6 and receive service, the user causes biometrics information to be read from an image capture device 1 provided in the automated gateway device 6. Similarly to FIG. 2, the automated gateway device 6 extracts biometrics information (example 1: fingerprint patterns) therefrom, and verifies this against biometrics characteristic data registered either on an IC card 5 held by the user or in a database server 4 as biometrics characteristic data, to authenticate the individual.

Method of Registration of Biometrics Information

Next, the method of registration of biometrics information explained in FIG. 2 is explained using FIG. 3 through FIG. 10.

Figure 3:
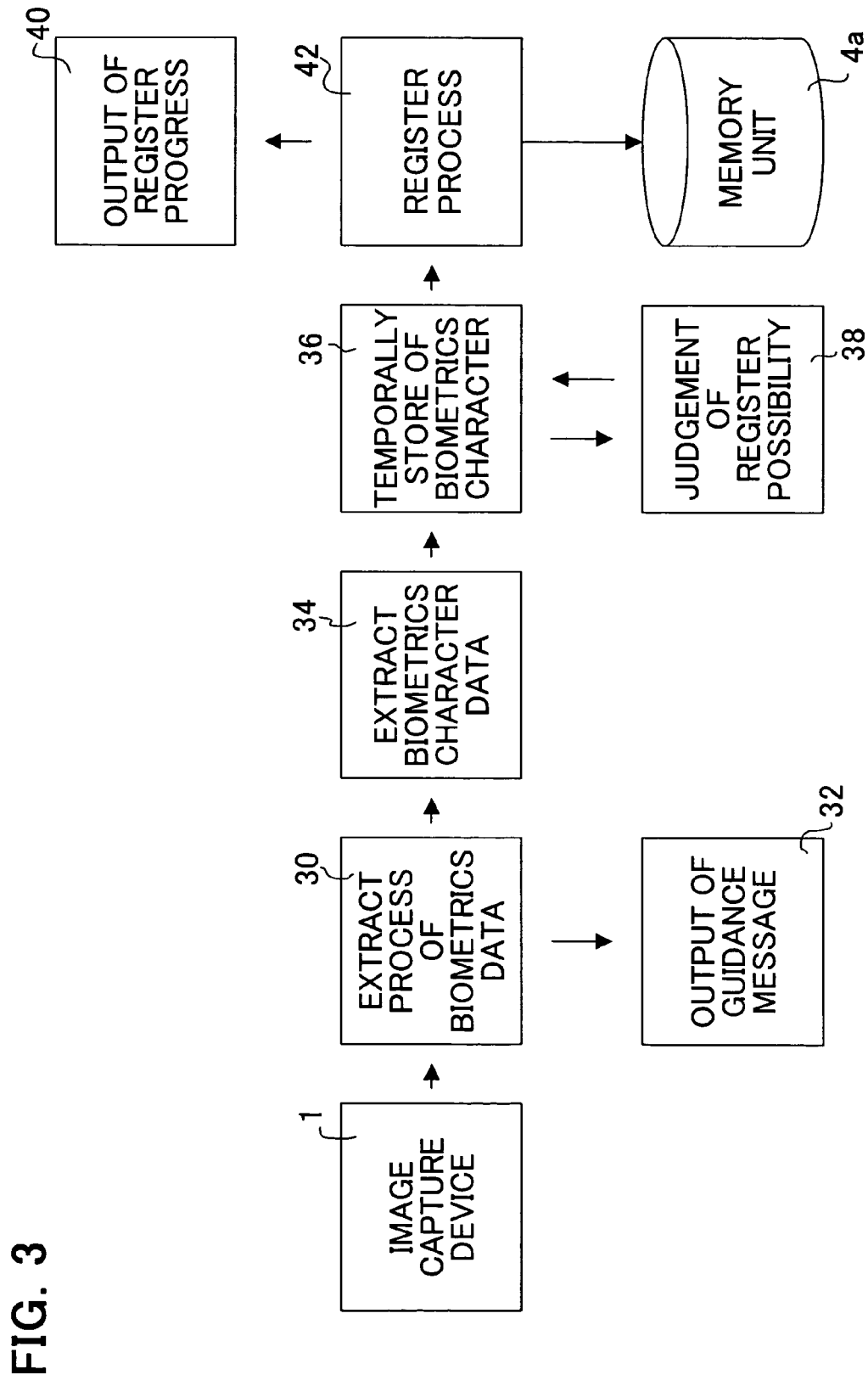
FIG. 3 is a functional block diagram of biometrics information registration processing in FIG. 2.
Figure 4:
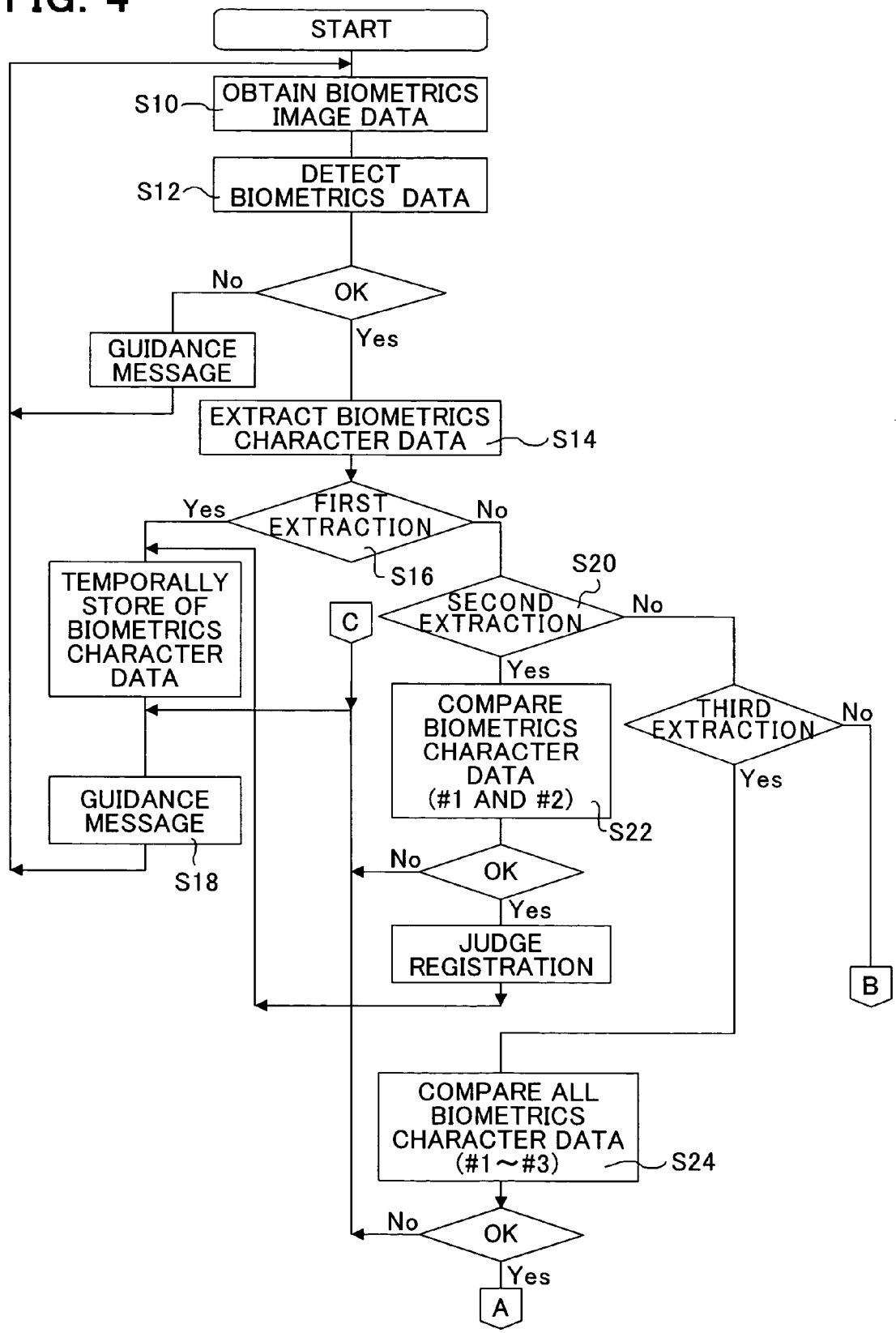
FIG. 4 is a first diagram of the flow of biometrics information registration processing in FIG. 3.
Figure 5:
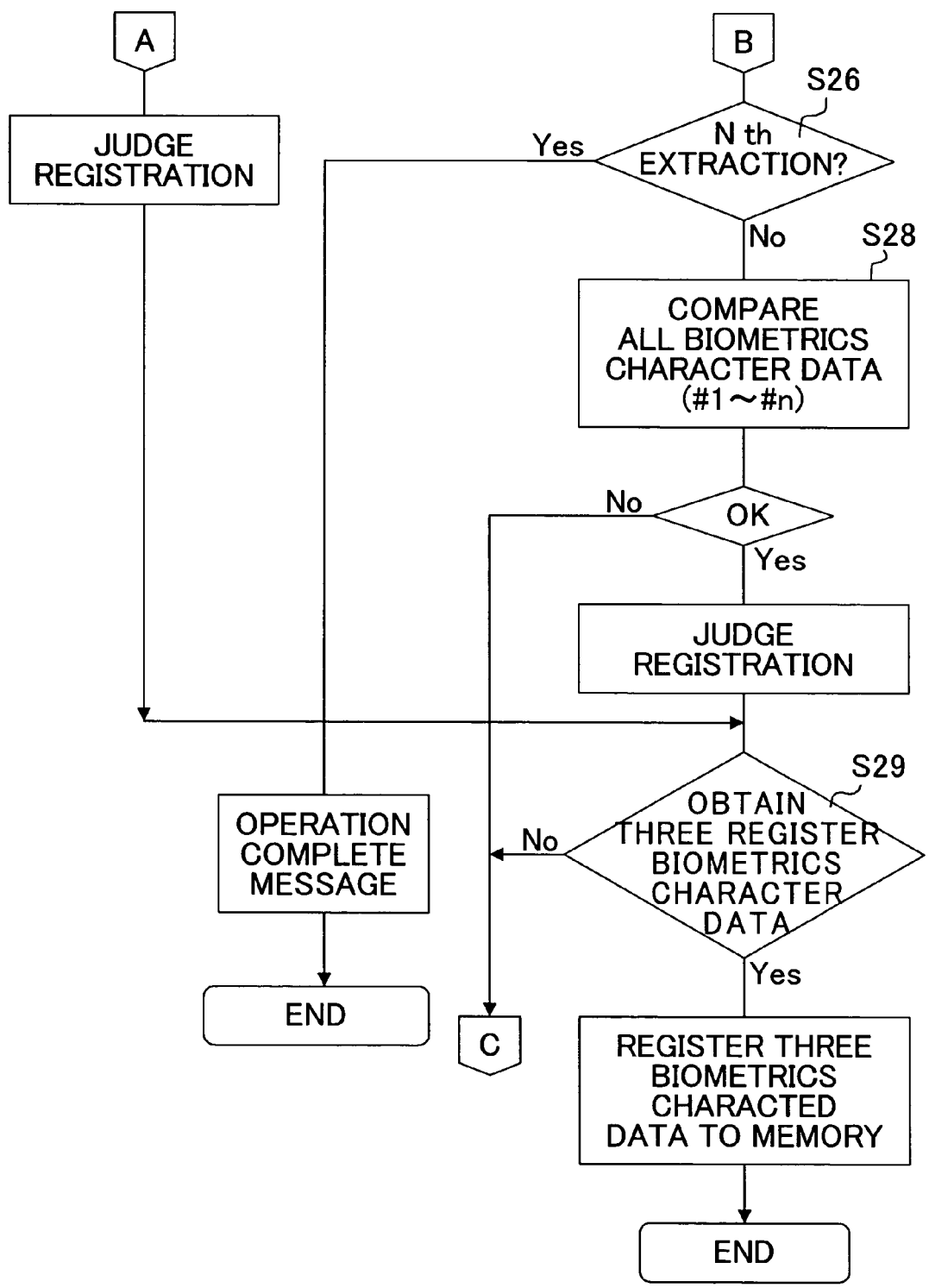
FIG. 5 is a second diagram of the flow of biometrics information registration processing in FIG. 3.
Figure 6:
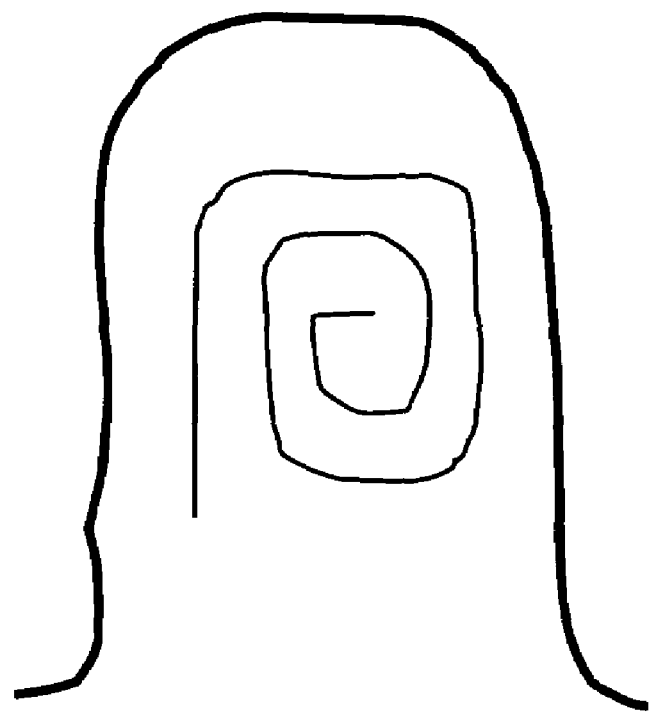
FIG. 6 is an explanatory drawing of fingerprint biometrics information.

FIG. 3 is a functional block diagram of processing to register biometrics information in a first embodiment of the invention; FIG. 4 and FIG. 5 are flow diagrams for the registration processing of FIG. 3; FIG. 6 explains the biometrics characteristics detected in the processing of FIG. 4 and FIG. 5; FIG. 7 explains judgment of the degree of similarity of biometrics characteristic data in FIG. 4 and FIG. 5; FIG. 8 explains an example of storage of biometrics characteristic data registered in the processing of FIG. 3; and FIG. 9 and FIG. 10 explain the registration processing of FIG. 3, FIG. 4, and FIG. 5.

As shown in FIG. 3, the terminal device 3 connected to the image capture device 1 executes a series of registration processing 30 to 42. The terminal device 3 comprises, for example, a personal computer, and has a display unit, keyboard unit and data processing unit, as shown as an external view in FIG. 1. The data processing unit has a CPU, various types of memory, interface circuitry, and other circuitry necessary for data processing. The CPU executes the series of registration processing 30 through 42.

Biometrics information detection processing 30 detects biometrics information in images captured by the image capture device 1, and judges whether the images can be used in registration and verification processing. For example, biometrics information may not appear sufficiently in images. Guidance message output processing 32 outputs to the display of the terminal device 3 a message providing guidance for placement of a part of the body (for example, a finger), to the left, right, higher or lower when an image cannot be used in registration and verification processing. By this means, the operator of the terminal device 3 guides a user of the image capture device 1 to correct placement of the body part in question.

Biometrics characteristic extraction processing 34 extracts biometrics characteristic data from the biometrics information when, in biometrics information detection processing 30, it is judged that an image has been captured with the body part in the correct position. That is, due to differences in reflectivity, grayscale data of a body image is obtained as in FIG. 7. This biometrics information is an image such as shown in FIG. 8, and the data is grayscale data as shown in FIG. 7.

Temporary biometrics characteristic storage processing 36 temporarily stores the extracted biometrics characteristic data. Registration possibility judgment processing 36 judges the degree of similarity of a plurality of biometrics characteristic data sets and judges whether registration is possible, in order to register a plurality of optimal biometrics characteristic data sets from among the plurality of biometrics characteristic data sets stored temporarily by temporary biometrics characteristic storage processing 36. Registration processing 42 registers, in the storage portion 4*a*, biometrics characteristic data for which registration has been judged possible. Registration progress output processing 40 outputs, to the display of the terminal device 3, the state of progress of registration processing 42.

Thus exactly the same biometrics characteristic data is not necessarily obtained at each image capture, and differences occur due to the image capture device, to changes in physical condition, and to the state of image capture, including the angle and position at which images are captured. Consequently in this invention, image capture is performed a plurality of times, and only optimal information of sufficient value to be registered is registered. However, the person performing registration (the user) is required to perform dozens of registration operations, the burden on the user is considerable. Hence the number of operations is limited to a number to which users are agreeable, and the optimum registration information is retrieved from this and registered in the storage portion.

FIG. 4 and FIG. 5 explain in detail the flow of processing.

(S10) Near-infrared light is irradiated by the image capture device 1 to obtain a biometrics information image.

(S12) As stated above, the biometrics information detection processing 30 detects the biometrics information from images captured by the image capture device 1. When sufficient biometrics information does not appear in the image, the processing 30 judges that captured image is NG. Then the guidance message output processing 32 outputs to the display of the terminal device 3 a message guiding the user to position the body part higher, lower, to the left or right. And processing returns to step S10.

(S14) When in the biometrics information detection processing 30 it is judged that an image was captured in the correct position, the biometrics characteristic extraction processing 34 extracts the biometrics characteristic data from the biometrics information.

(S16) A judgment is made as to whether this is the first extraction. If the first extraction, the biometrics characteristic data for the first extraction is stored temporarily.

(S18) Next, a guidance message prompting repeated operation is output to the display of the terminal device 3, and processing returns to step S10.

(S20) On the other hand, if in step S16 the extraction is not the first, but is judged to be the second or later, then a judgment is made as to whether the extraction is the second extraction.

(S22) When the extraction is the second extraction, the biometrics characteristic data of the first extraction and the biometrics characteristic data of the second extraction are compared, and the degree of similarity is calculated. The degree of similarity is a quantity indicating the extent to which the two biometrics characteristic patterns coincide, and various pattern matching techniques can be applied. For example, as in the case of fingerprints, in the grayscale representation pixel matrix of the two biometrics characteristic patterns in FIG. 7, two pattern pixel values (grayscale values) are acquired in pixels of interest and are compared. If the two coincide, a degree-of-similarity counter is incremented by 1. The pixel of interest is then moved, and in a similar manner, pixel values are compared to judge whether there is coincidence. If the two coincide, the degree-of-similarity counter is incremented by 1. This is performed for all the pixels in the pixel matrix, and the degree-of-similarity counter value is taken to be the degree of similarity. If the degree of similarity is equal to or greater than a predetermined value, a judgment of similarity (OK) is made, it is judged that the biometrics characteristic data of the second extraction can be registered. And processing returns to step S10. If on the other hand the degree of similarity does not exceed a threshold value, the data is judged to be not similar (NG). Processing then proceeds to the repeated operation guidance message output of step S18.

Figure 9:
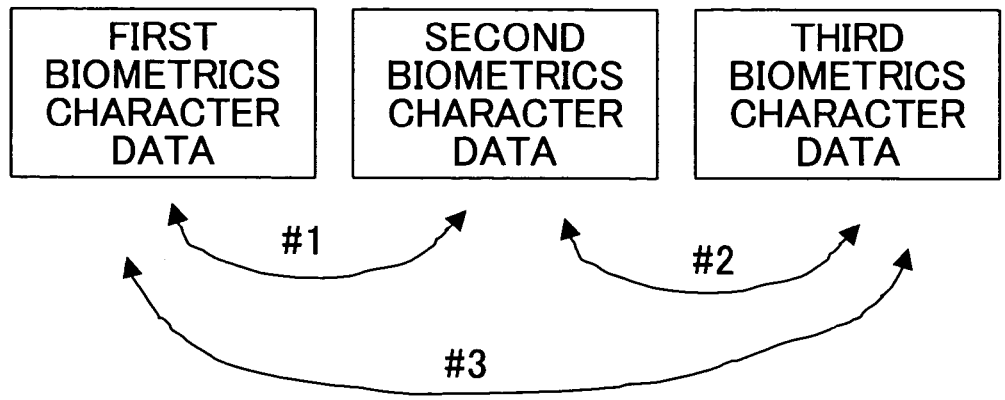
FIG. 9 is an explanatory diagram of mutual comparison of three biometrics characteristic data sets in FIG. 4.

(S24) On the other hand, if in step S20 the extraction is judged to be the third rather than the second extraction, the degree of similarity of the biometrics characteristic data of the third extraction with the biometrics characteristic data extracted thus far (here, in the first and second extractions) is similarly calculated. That is, as shown in FIG. 9, in step S22 the degree of similarity #1 of the biometrics characteristic data of the second extraction and the biometrics characteristic data of the first extraction is calculated and judged. In step S24, the degree of similarity #3 of the biometrics characteristic data of the third extraction and that of the first extraction, and the degree of similarity #2 of the biometrics characteristic data of the third extraction and that of the second extraction, are calculated and judged. Through mutual comparison, if all the degrees of similarity #1, #2, #3 are equal to or exceed a threshold value, then all three are judged to be similar biometrics characteristics. Processing then proceeds to step S30. On the other hand, if in the mutual comparison of FIG. 9 one among the degrees of similarity #1, #2, #3 does not exceed the threshold value, processing returns to step S18. That is, in step S24 three sets of biometrics characteristic data are not obtained even after capturing images and extracting biometrics characteristics three times, image capture is performed again, that is, for a fourth time, and biometrics characteristic extraction is performed.

(S26) A judgment is made as to whether extraction is the Nth extraction exceeding the third (the fourth or later). N is set as a limiting number, since if some phenomenon incompatible with registration continues to occur, the burden on the operator is considerable. If the number of extraction is equal to N, a message is output instructing the user to repeat from the beginning or to consult with onsite personnel.

Figure 10:
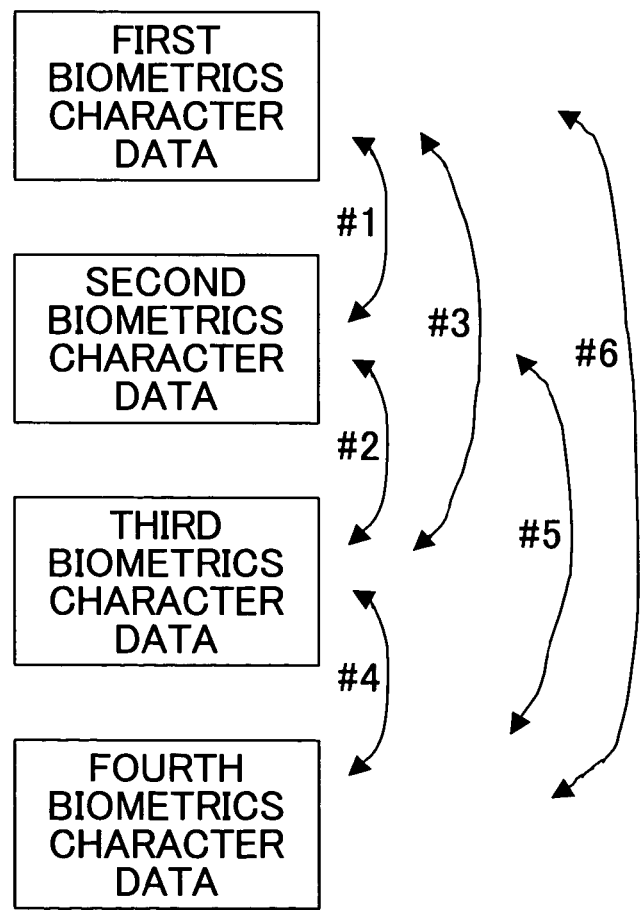
FIG. 10 is an explanatory diagram of mutual comparison of four biometrics characteristic data sets in FIG. 5.

(S28) On the other hand, if the extraction number is within the limiting number N, then as shown in FIG. 10, the degree of similarity #6 between the biometrics characteristic data of the fourth extraction and that of the first extraction, the degree of similarity #5 between the biometrics characteristic data of the fourth extraction and that of the second extraction, and the degree of similarity #4 between the biometrics characteristic data of the fourth extraction and that of the third extraction, are calculated and judged. If all the degrees of similarity #4, #5, #6 are equal to or above the threshold value, the three biometrics characteristics with the highest degree of similarity among the first, fourth, second, and third extractions are judged to be similar. But if in the mutual comparisons of FIG. 10 even one among the degrees of similarity #4, #5, #6 is judged not to exceed the threshold value, processing returns to step S18, a fifth image capture and biometrics characteristic extraction are performed, and the degrees of similarity are similarly calculated and judged.

(S29) When three similar biometrics characteristic data sets have been obtained, these are registered in the storage portion 4a together with the user ID. FIG. 8 shows the biometrics characteristic data registered in the storage portion 4a; the user ID and three biometrics characteristic data sets (here, black/white two-value data series) are registered in the storage portion 4a. If three sets are not obtained, image capture and biometrics characteristic data extraction are performed up to the number of times set in the system (N times).

In this way, biometrics characteristic data is extracted a plurality of times, and a plurality (here, 3) of biometrics characteristic data sets with high degrees of similarity are registered as optimal biometrics characteristic data. Hence even when there are differences in biometrics information due to the image capture device, changes in physical condition, or the state of image capture of biometrics information, because a plurality of images are captured and only optimum biometrics information with a high degree of similarity, of sufficient value for registration, is registered, a plurality of biometrics information sets can be registered reflecting differences, without lowering the accuracy of verification. Because obligating the person performing registration (the user) to perform dozens of registration operations would constitute a considerable burden on the user, only a number of operations to which users are normally agreeable are required, and the optimum registration information among this is retrieved and registered in the storage portion.

Biometrics Information Registration Processing to Perform Trial Authentication

Next, trial authentication is explained. As stated above, when n (in the above, 3) registrations have been completed, verification and authentication are performed there and then. This provides practice for the user for the next time biometrics images are captured for verification, and also enables the user to confirm that his own biometrics information can be reliably used for authentication. As a result, reassurance and trust in the system are increased. This trial authentication is performed by the same procedure as for actual authentication, and is explained below using FIG. 12 through FIG. 14.

Figure 11:
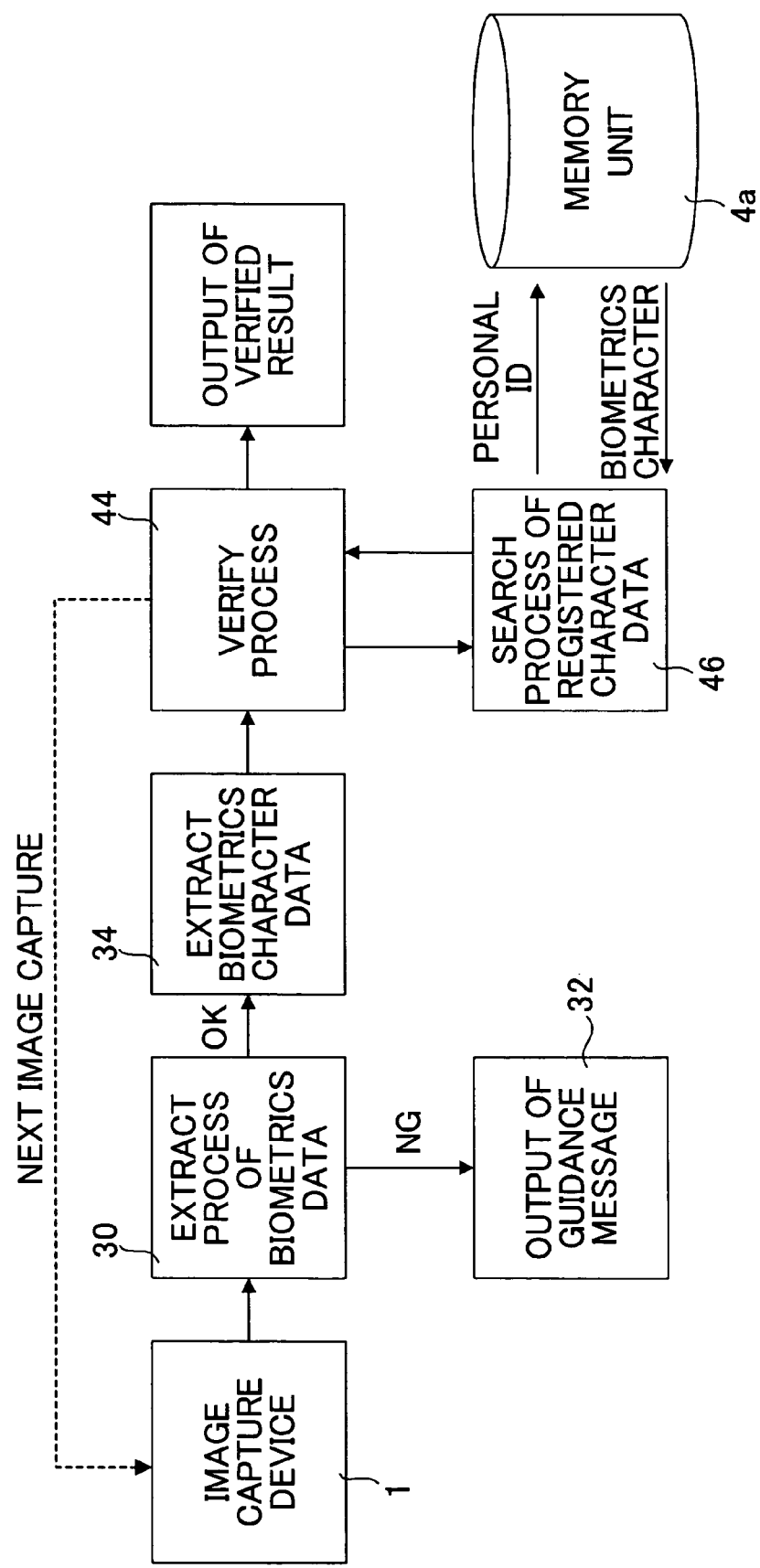
FIG. 11 is a functional block diagram of trial authentication processing in another embodiment of the invention.
Figure 12:
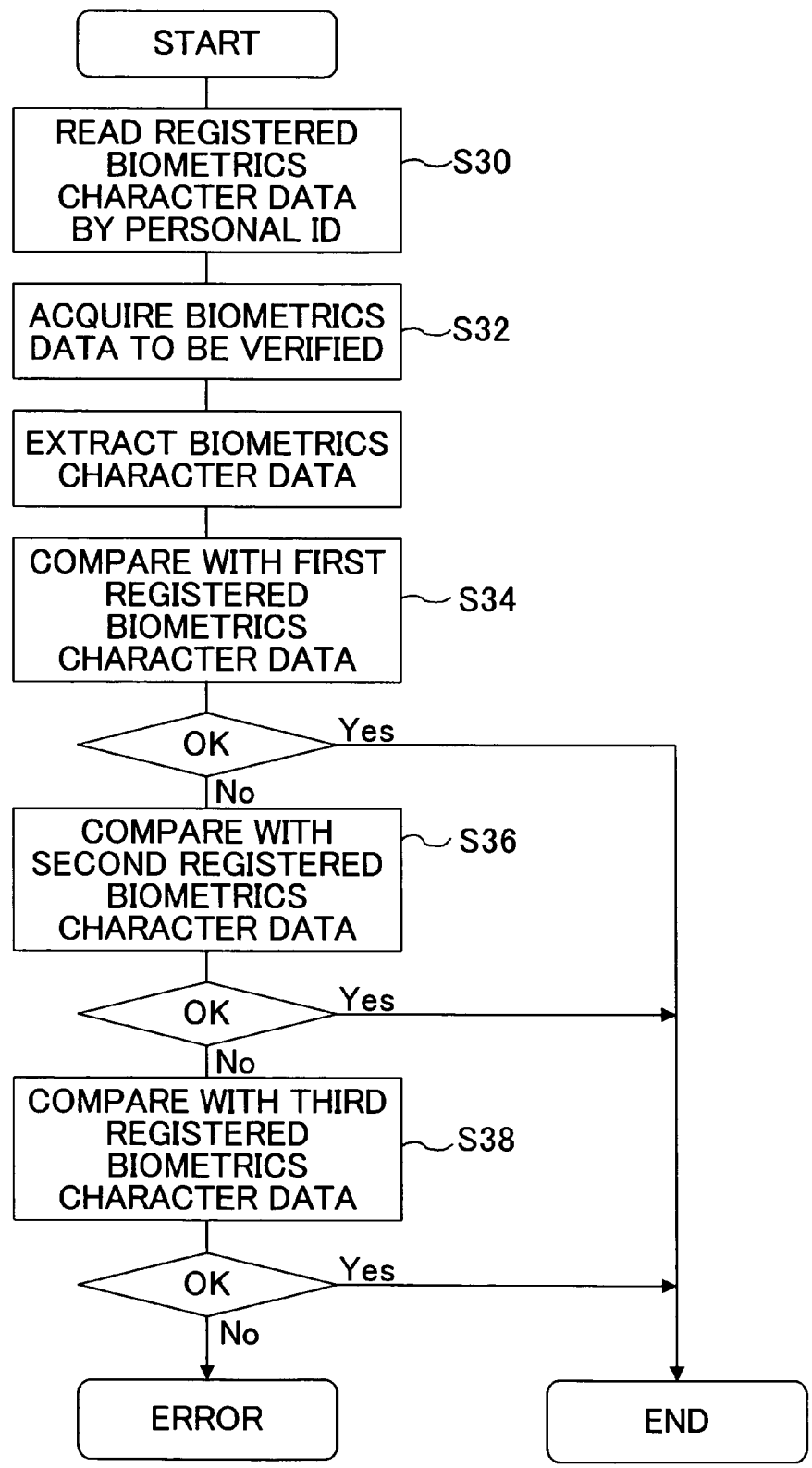
FIG. 12 is a diagram of the flow of trial authentication processing in FIG. 11; and, FIG. 13 is an explanatory diagram of verification processing in FIG. 11.

FIG. 11 is a functional block diagram of authentication processing in an embodiment of the invention; FIG. 12 is a diagram of the flow of authentication processing in FIG. 11; and FIG. 13 explains the operation in FIG. 11.

In FIG. 11, portions which are the same as in FIG. 2 and FIG. 3 are shown with the same symbols. That is, the terminal device 3 connected to the image capture device 1 executes a series of authentication processing 30 to 46. The CPU of the terminal device 3 executes the series of authentication processing 30 to 46.

The biometrics information detection processing 30 detects biometrics information from images captured by the image capture device 1, and judges from the biometrics information images whether the images can be used in registration and verification processing. For example, biometrics information may not be sufficiently present in an image. The guidance message output processing 32 displays, on the display of the terminal device 3, a message to provide guidance to move the body part upward, downward, to the left or right, when the captured image cannot be used in authentication and verification processing. By this means, the operator of the terminal device 3 guides the user of the image capture device 1 to obtain biometrics information.

The biometrics characteristic extraction processing 34 extracts biometrics characteristic data from the biometrics information when the biometrics information detection processing 30 judges that an image has been captured at the correct body part position. That is, as shown in FIG. 7, grayscale data of an image of biometrics information is obtained.

Figure 13:
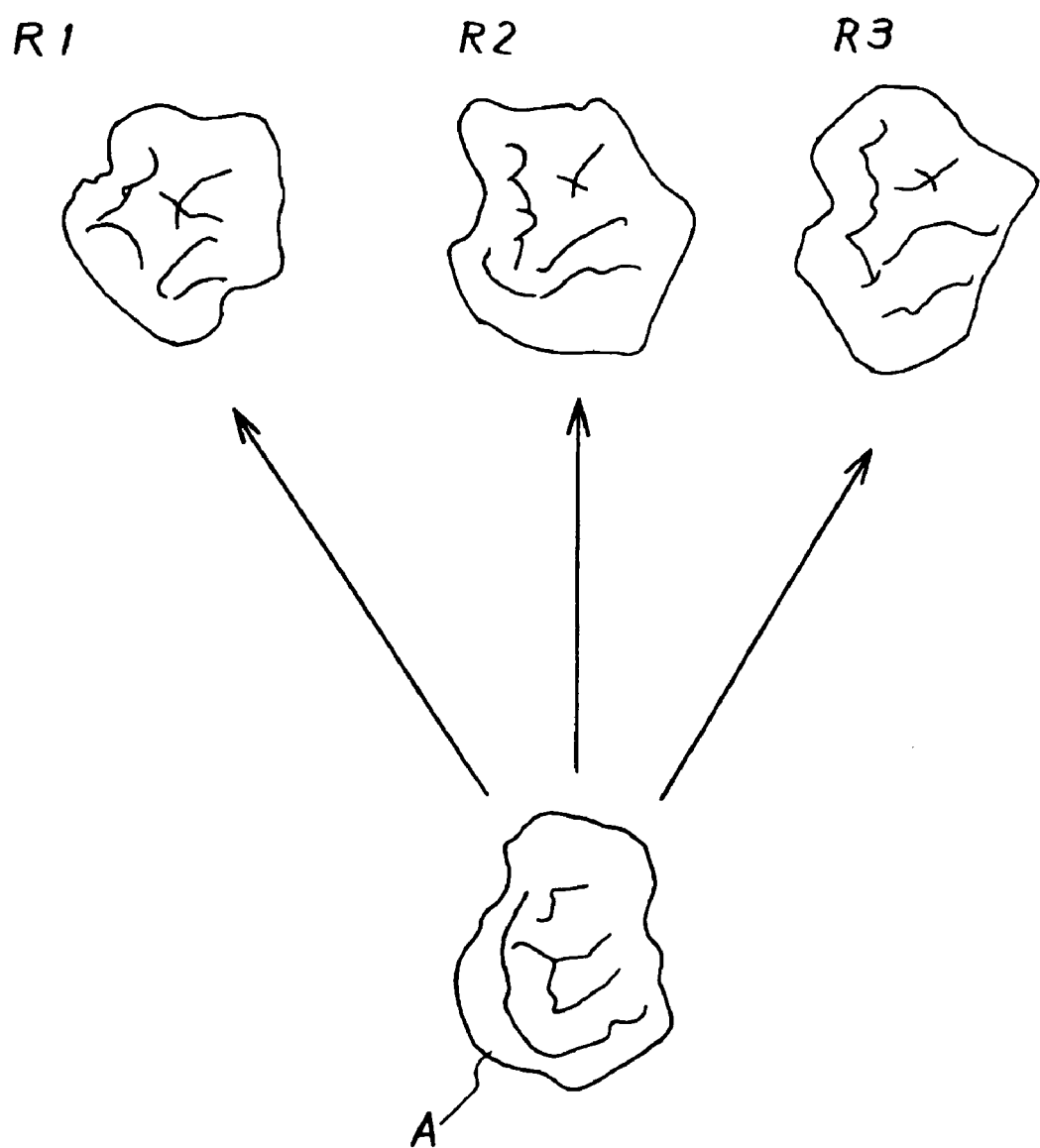

Registered biometrics characteristic search processing 46 searches the storage portion 4a for the three sets of registered biometrics characteristic data R1, R2 and R3 corresponding to the individual ID, as shown in FIG. 8. Verification processing 44 compares the biometrics characteristic data A extracted by biometrics characteristic detection processing 34 with the three sets of registered biometrics characteristic data R1, R2, R3, as shown in FIG. 13, performs verification processing, and outputs the verification result.

FIG. 12 provides a more detailed explanation.

(S30) The three sets of biometrics characteristic data R1, R2, R3 for the ID presented by the user are read from the storage portion 4a.

(S32) Irradiation with near-infrared light from the image capture device 1 is used to obtain a biometrics information image. The biometrics information detection processing 30 detects the outline of the hand from the image captured by the image capture device 1, and from the outline judges whether the image can be used in verification processing. When sufficient biometrics information is not present in the image or in similar cases, a captured image is judged as NG. Then the guidance message output processing 32 output, to the display of the terminal device 3, a message providing guidance to move the body part upward, downward, right or left. When the biometrics information detection processing 30 judge that an image has been obtained in the correct position, the biometrics characteristic extraction processing 34 extracts the biometrics characteristic data from the biometrics information.

(S34) The first registered biometrics characteristic data set R1 is compared with the extracted biometrics characteristic data set A, and the degree of similarity is calculated. The degree of similarity is a quantity indicating the extent of coincidence of the two biometrics characteristic patterns, and various pattern matching techniques may be used. If the degree of similarity is equal to or greater than a predetermined threshold value, the two are judged to be similar (OK), authentication is accomplished, and processing ends.

(S36) If on the other hand in step S34 the degree of similarity does not exceed the threshold value, a judgment of not similar (NG) is returned. Then, the second registered biometrics characteristic data set R2 is compared with the extracted biometrics characteristic data set A, and the degree of similarity is calculated. If the degree of similarity is equal to or greater than the predetermined threshold value, the two are judged to be similar (OK), authentication is accomplished, and processing ends.

(S38) If on the other hand in step S36 the degree of similarity does not exceed the threshold value, a judgment of not similar (NG) is returned. Then, the third registered biometrics characteristic data set R3 is compared with the extracted biometrics characteristic data set A, and the degree of similarity is calculated. If the degree of similarity is equal to or greater than the predetermined threshold value, the two are judged to be similar (OK), authentication is accomplished, and processing ends. If, however, the threshold value is not exceeded, the two are judged not to be similar, and processing ends with an error.

In this trial authentication, as shown in FIG. 11, if verification processing is not satisfactory the terminal device 1 can be instructed to capture another image. Hence there are increased opportunities for trial authentication by users, who can become familiar with the authentication method, contributing to the widespread use of the authentication system.

Other Embodiments

In the above-described embodiment, biometrics authentication was explained for the case of fingerprints; but the embodiment can also be applied to palm prints, palm types, iris patterns, retina features, blood vessel patterns, facial features, voiceprints, manners of walking, the concha of the ear, DNA, and similar.

Further, calculation of degree of similarity was explained using bitmap pattern matching techniques, but widely-known methods for vectorizing data and calculating degree of similarity in terms of vector directions and lengths can also be used. Also, branch points, endpoints and other minutiae can be used in calculations. The number of registrations is not limited to three times, but may be any number greater than 1. Verification (authentication) processing is performed by the same method as in FIG. 11 through FIG. 13, and is executed by the gateway terminal 8 and automated gateway terminal 6 in FIG. 1.

In the above, embodiments of the invention have been explained, but various modifications of the invention are possible within the scope of the invention, and such modifications are not excluded from the scope of the invention.

Biometrics information is acquired a plurality of times for the same living body from a detection unit, the mutual degrees of similarity among characteristic data extracted from said plurality of sets of biometrics information are judged, and a plurality of characteristic data sets with a high degree of similarity are registered in a storage unit, so that even when biometrics characteristic data detected a plurality of times is used, verification can be performed which accommodates changes in the state of the living body without lowering verification accuracy, and moreover problems for the user can be prevented, contributing to widespread use of the biometrics authentication system.

What is claimed is:

1. A biometrics authentication system, which detects biometrics characteristic data from a living body and verifies the detected biometrics characteristic data against registered characteristic data prior obtained from said living body to authenticate an individual, comprising:

a detection unit which detects biometrics information from said living body;

a storage unit which stores said registered biometrics characteristic data; and a processing unit which extracts said biometrics characteristic data from the biometrics information detected by said detection unit and registers said biometrics characteristic data in said storage unit, and which extracts said biometrics characteristic data from the biometrics information detected by said detection unit and verifies said extracted biometrics characteristic data against said biometrics characteristic data registered in said storage unit to authenticate the individual, wherein said processing unit obtains the biometrics information for the same living body from said detection unit a plurality of times, judges the degree of mutual similarity of biometrics characteristic data sets extracted from said biometrics information obtained a plurality of times, and registers a plurality of biometrics characteristic data sets with a high degree of similarity in said storage unit, and wherein said processing unit registers the biometrics characteristic data acquired the first time in said storage unit, as a reference data, and, acquires the biometrics characteristic data a second time, calculates the degrees of similarity with biometrics characteristic data sets between the first time and the second time, and when the degree of similarity of the biometrics characteristic data for registration is equal to or greater than a threshold value, registers said biometrics characteristic data for the second time in said storage unit, when the degree of similarity of the biometrics characteristic data for registration is not equal to or greater than a threshold value, acquires the biometrics characteristic data a third time, performs repeatedly said calculation and said registration until a prescribed number of biometric characteristic data sets with a high degree of the similarity to the first time biometric characteristic data are obtained.

2. The biometrics authentication system according to claim 1, wherein said processing unit, after registering said plurality of characteristic data sets with high degree of similarity in said storage unit, acquires the biometrics information from said detection unit, extracts said biometrics characteristic data, verifies the biometrics characteristic data against the plurality of biometrics characteristic data sets registered in said storage unit to perform trial authentication.

3. The biometrics authentication system according to claim 1, wherein said detection unit comprises an image capture unit which captures images of biometrics information of the user, as said biometrics information, and wherein the biometrics characteristic data registered in said storage unit is the biometrics characteristic data obtained from said biometrics information.

4. The biometrics authentication system according to claim 1, wherein said processing unit judges the degree of similarity to be high when said degree of similarity is equal to or greater than a prescribed threshold value.

5. The biometrics authentication system according to claim 1, wherein said processing unit, at the time of individual authentication, reads said plurality of biometrics characteristic data sets from said storage unit according to identification information of said individual, acquires the biometrics information from said detection unit, extracts said biometrics characteristic data, and verifies said extracted biometrics characteristic data against said plurality of biometrics characteristic data sets registered in said storage unit.

6. The biometrics authentication system according to claim 5, wherein said processing unit detects the fact that said extracted biometrics characteristic data is similar to one among said plurality of registered characteristic data sets, and performs individual authentication.

7. A registration method for a biometrics authentication system which detects biometrics characteristic data from a living body and verifies the detected biometrics characteristic data against registered characteristic data prior obtained from said living body to authenticate an individual, comprising the steps of:
   acquiring, a plurality of times, biometrics information for the same living body from a biometrics detection unit;
   judging the mutual degree of similarity of characteristic data sets extracted from said biometrics information obtained a plurality of times; and,
   registering a plurality of biometrics characteristic data sets with a high degree of similarity, in a storage unit,
   wherein said step of judging degree of similarity comprises:
   a step of calculating, for biometrics characteristic data acquired the first time and second time, all the degrees of similarity with biometrics characteristic data between the first time and the second time;
   a step of judging the characteristic data to be appropriate for registration for the second time when the degree of similarity of biometrics characteristic data for registration is equal to or greater than a threshold value, and acquiring the biometrics characteristic data a third time when the degree of similarity of the biometrics characteristic data for registration is not equal to or greater than a threshold value, and performing repeatedly said calculation and said judging the characteristic data to be appropriate for registration until a prescribed number of biometric characteristic data sets with a high degree of the similarity to the first time biometric characteristic data are obtained.

8. The registration method for a biometrics authentication system according to claim 7, wherein said step of acquiring biometrics information a plurality of times comprises a step of acquiring the same said biometrics information from said detection unit until a prescribed number of characteristic data sets with a high degree of similarity are obtained.

9. The registration method for a biometrics authentication system according to claim 7, further comprising a step of trial authentication after registering said plurality of characteristic data sets with a high degree of similarity in said storage unit.

10. The registration method for a biometrics authentication system according to claim 9, wherein said trial authentication step comprises the steps of:
   acquiring the biometrics information from said biometrics detection unit;
   extracting said biometrics characteristic data; and
   verifying said biometrics characteristic data against said plurality of characteristic data sets registered in said storage unit.

11. The registration method for a biometrics authentication system according to claim 7, wherein said step of acquiring biometrics information comprises a step of obtaining captured image data from an image capture unit which captures images of biometrics information of a user, and wherein said registration step comprises a step of obtaining biometrics characteristic data obtained from said biometrics information.

12. The registration method for a biometrics authentication system according to claim 7, wherein said step of judging degree of similarity comprises a step of judging, when said degree of similarity is equal to or greater than a prescribed threshold value, the degree of similarity.

13. The registration method for a biometrics authentication system according to claim 7, further comprising a step of individual authentication, wherein said individual authentication step comprises the steps of:
   reading from said storage unit said plurality of biometrics characteristic data sets according to identification information for said individual;
   acquiring the biometrics information from said detection unit;
   extracting said biometrics characteristic data; and
   verifying said biometrics characteristic data against said plurality of biometrics characteristic data sets registered in said storage unit.

14. The registration method for a biometrics authentication system according to claim 13, wherein said step of verification comprises a step of detecting whether said extracted biometrics characteristic data is similar to one among said plurality of registered characteristic data sets, and of performing individual authentication.

15. A program stored on a computer-readable medium to cause a computer to execute the steps of:
   acquiring biometrics information for the same living body a plurality of times from a biometrics detection unit;
   judging the mutual degree of similarity among biometrics characteristic data sets extracted from said biometrics information acquired a plurality of times; and
   registering a plurality of characteristic data sets with a high degree of similarity in a storage unit,
   wherein said step of judging degree of similarity comprises:
   a step of calculating, for biometrics characteristic data acquired the first time and second time, all the degrees of similarity with biometrics characteristic data between the first time and the second time;

a step of judging the characteristic data to be appropriate for registration for the second time when the degree of similarity of biometrics characteristic data for registration is equal to or greater than a threshold value, and acquiring the biometrics characteristic data a third time when the degree of similarity of the biometrics characteristic data for registration is not equal to or greater than a threshold value, and performing repeatedly said calculation and said judging the characteristic data to be appropriate for registration until a prescribed number of biometric characteristic data sets with a high degree of the similarity to the first time biometric characteristic data are obtained.

16. The program according to claim 15, further causing a computer to execute a step, after registration of said plurality of characteristic data sets with a high degree of similarity, of acquiring biometrics information from said biometrics detection unit, of extracting said biometrics characteristic data, of verifying said biometrics characteristic data against said plurality of characteristic data sets registered in said storage unit, and of performing trial authentication.

* * * * *